(12) United States Patent
Bowen et al.

(10) Patent No.: US 12,448,053 B2
(45) Date of Patent: Oct. 21, 2025

(54) MECHANISM FOR SECURING A VEHICLE PROTECTION SYSTEM AND A BACKING PLATE OF A BRAKE ASSEMBLY TO AN AXLE OF A VEHICLE

(71) Applicant: RV-De-Fender, LLC, Sandy, UT (US)

(72) Inventors: Gregory Adam Bowen, Sandy, UT (US); Todd Ryan Smith, Sandy, UT (US); Zackary Donald Patterson, Harrisville, UT (US)

(73) Assignee: RV-De-Fender, LLC, Herriman, UT (US)

( * ) Notice: Subject to any disclaimer, the term of this patent is extended or adjusted under 35 U.S.C. 154(b) by 345 days.

(21) Appl. No.: 18/167,338

(22) Filed: Feb. 10, 2023

(65) Prior Publication Data

US 2024/0270322 A1    Aug. 15, 2024

(51) Int. Cl.
*B62D 25/16*    (2006.01)
*B60R 19/00*    (2006.01)
(Continued)

(52) U.S. Cl.
CPC ....... *B62D 25/163* (2013.01); *F16D 65/0056* (2013.01); *B60R 2019/002* (2013.01); *F16D 2051/003* (2013.01); *F16D 2055/0008* (2013.01)

(58) Field of Classification Search
CPC ...... B62D 25/163; B62D 25/18; B62D 25/16; F16D 65/0056; F16D 2051/003;
(Continued)

(56) References Cited

U.S. PATENT DOCUMENTS 332,022 A    12/1885   Todd
460,053 A     9/1891   Paine
(Continued)

FOREIGN PATENT DOCUMENTS

AT          396349 B      6/1993
CN       108609057 A    10/2018
(Continued)

OTHER PUBLICATIONS

Deere, John Deere 3010 Row-Crop and Standard Tractors Operator's Manual, OM-R32385, "Operation" section, (Site visited Sep. 3, 2024), Deere.com, URL: https://techinfo-omview.apps-prod-vpn.us.e06.c01.johndeerecloud.com/omview/omr32385/8 (Year 1965).
(Continued)

*Primary Examiner* — James A Shriver, II
*Assistant Examiner* — Ian Bryce Shelton
(74) *Attorney, Agent, or Firm* — Gurr & Brande, PLLC; Robert A. Gurr

(57) ABSTRACT

A mechanism for securing a vehicle protection system to an axle of a vehicle is provided. The mechanism may include a plurality of studs that are configured to secure the vehicle protection system and the backing plate of a brake assembly to an axle flange of a vehicle's axle. Each stud may include an outer end separated from an inner end by a spacer. The outer end may also include an expanded section adjacent the spacer that can be positioned within bolt holes of the axle flange. The expanded section may include knurls for forming a press fit within the bolt holes.

17 Claims, 8 Drawing Sheets

(51) Int. Cl.
*F16D 51/00* (2006.01)
*F16D 55/00* (2006.01)
*F16D 65/00* (2006.01)

(58) Field of Classification Search
CPC ....... F16D 2055/0008; B60R 2019/002; B60B 27/0057
See application file for complete search history.

(56) References Cited

U.S. PATENT DOCUMENTS

| | | | |
|---|---|---|---|
| 857,747 A | 6/1907 | McCauley | |
| 1,454,738 A | 5/1923 | Thomas | |
| 1,488,136 A | 3/1924 | Simpson | |
| 2,771,304 A | 11/1956 | Clarence | |
| 2,947,375 A * | 8/1960 | Lehmann | B62D 25/168 280/847 |
| 3,560,021 A | 2/1971 | Watson | |
| 4,934,733 A * | 6/1990 | Smith | B60G 3/207 280/124.132 |
| 5,169,167 A * | 12/1992 | Willson | B62D 25/186 280/157 |
| 5,269,396 A * | 12/1993 | Jones | F16D 51/24 188/335 |
| 5,387,001 A | 2/1995 | Hull | |
| 5,533,781 A | 7/1996 | Williams | |
| 5,836,399 A | 11/1998 | Maiwald | |
| 5,951,123 A * | 9/1999 | Bomstad | E02D 3/026 172/112 |
| 6,336,677 B2 | 1/2002 | Scott | |
| 6,658,984 B2 | 12/2003 | Zonak | |
| 6,802,517 B1 | 10/2004 | Wulhrich | |
| 7,523,980 B2 * | 4/2009 | Okamoto | B62D 27/065 470/57 |
| 7,832,812 B1 * | 11/2010 | Scott | B60B 11/10 301/130 |
| 8,052,200 B2 | 11/2011 | Bharani et al. | |
| 8,657,350 B2 | 2/2014 | Cabo | |
| 8,770,655 B1 | 7/2014 | Godby | |
| 8,827,015 B2 * | 9/2014 | Power | B60B 35/02 301/124.1 |
| 9,193,392 B2 * | 11/2015 | Lodi | B62D 25/00 |
| 9,637,176 B2 * | 5/2017 | Heino | B62D 25/186 |
| 9,969,211 B2 * | 5/2018 | Niemczyk | B60B 11/02 |
| 10,054,177 B2 * | 8/2018 | Emmons | F16D 65/09 |
| 10,260,580 B2 * | 4/2019 | Merrill | F16D 65/091 |
| 10,323,909 B2 | 6/2019 | Carton et al. | |
| 10,690,205 B2 * | 6/2020 | Emmons | F16D 65/09 |
| 10,882,566 B2 * | 1/2021 | Bering | B62D 24/02 |
| 11,318,998 B2 * | 5/2022 | Hamel | B62D 25/184 |
| 11,453,444 B2 | 9/2022 | Bowen et al. | |
| 11,802,598 B2 * | 10/2023 | Philpott | F16D 65/0056 |
| 2004/0118643 A1 * | 6/2004 | Booher | F16D 55/22 188/73.1 |
| 2005/0168056 A1 * | 8/2005 | Roberts | F16D 55/22 301/124.1 |
| 2006/0108765 A1 | 5/2006 | Teich | |
| 2007/0001484 A1 * | 1/2007 | Okamoto | B62D 29/048 296/193.05 |
| 2007/0182151 A1 * | 8/2007 | Aulabaugh | B62D 25/161 280/849 |
| 2008/0006742 A1 | 1/2008 | Guering | |
| 2011/0080019 A1 | 4/2011 | Castillo | |
| 2012/0080908 A1 | 4/2012 | Wellman | |
| 2013/0098697 A1 * | 4/2013 | Power | B60B 35/04 301/132 |
| 2013/0313389 A1 * | 11/2013 | Lodi | B62D 25/16 248/214 |
| 2015/0299982 A1 * | 10/2015 | Angelo | E02F 9/0858 280/154 |
| 2016/0128278 A1 * | 5/2016 | Rau | B62D 25/16 293/58 |
| 2016/0288843 A1 * | 10/2016 | Fujimoto | B60D 1/02 |
| 2017/0191535 A1 * | 7/2017 | Emmons | F16D 65/09 |
| 2017/0313129 A1 * | 11/2017 | Garrett | F16D 55/00 |
| 2017/0334486 A1 * | 11/2017 | Plebani | B62D 25/168 |
| 2018/0245646 A1 * | 8/2018 | Merrill | F16D 51/20 |
| 2018/0355934 A1 * | 12/2018 | Emmons | F16D 65/09 |
| 2020/0122782 A1 * | 4/2020 | Hamel | B62D 25/168 |
| 2020/0262488 A1 * | 8/2020 | Bering | B62D 25/188 |
| 2020/0262498 A1 * | 8/2020 | Bender | B62D 25/188 |
| 2022/0018404 A1 * | 1/2022 | Philpott | F16D 65/0056 |

FOREIGN PATENT DOCUMENTS

| | | | | |
|---|---|---|---|---|
| CN | 110091688 A | | 8/2019 | |
| CN | 110406373 A | * | 11/2019 | ............ B60B 35/12 |
| DE | 102004054692 A1 | | 6/2006 | |
| EP | 0913320 A2 | | 5/1999 | |
| EP | 13146633 A1 | | 5/2003 | |
| FR | 574516 A | | 7/1924 | |
| FR | 2847876 A1 | | 6/2004 | |
| FR | 2896224 A1 | | 7/2007 | |
| GB | 2043006 A | | 10/1980 | |
| KR | 19980036635 U | | 9/1998 | |
| WO | 2014047093 A1 | | 3/2014 | |
| WO | 2016075573 A1 | | 10/2015 | |
| WO | 2017125904 A1 | | 7/2017 | |
| WO | WO-2017146277 A1 | * | 8/2017 | |
| WO | 2017204715 A1 | | 11/2017 | |
| WO | WO-2018229048 A1 | * | 12/2018 | .......... B62D 25/163 |

OTHER PUBLICATIONS

TractorData.com entry for John Deere 3010 Tractor; (Site visited Sep. 3, 2024); TractorData.com; URL: https://tractordata.com/farm-tractors/000/0/6/60-john-deere-3010.html (Year 2000-2023).

Big Iron 2018 Auction Listing for 1961 John Deere 3010 Narrow Front 2WD Tractor; (Site visited Sep. 3, 2024); BigIron.com; URL: https://www.bigiron.com/Lots/1961JohnDeere3010narrowfront2WDTractor (Year 2018).

Yesterday's Tractor Co listing for John Deere 3010 Fender Bracket, used; yesterdaytractors.com (Site visited Sep. 3, 2024); URL: https://www.yesterdaytractors.com/499434_Fender-Bracket-Used_77969.htm (Year 1997-2024.

John Deere Operators Manual OMLG100524 entry for Adjusting the Fixed Fenders; manuals.deere.com (Site visited Mar. 9, 2024); URL: http://manuals.deere.com/omview/OMLG100524_19/?tM=#:~:text=All%20information,%20illustrations%20and%20specifications%20in%20this%20manual%20are%20based (Year 201.

Jul. 18, 2016 capture of Minimizer Lift Axle Bracket (Site visited Sep. 3, 2024); web.archive.org; URL: https://web.archive.org/web/20160616013604/www.minimizer.com/product/minimizer-lift-axle-bracket/ (Year 2016).

* cited by examiner

MECHANISM FOR SECURING A VEHICLE PROTECTION SYSTEM AND A BACKING PLATE OF A BRAKE ASSEMBLY TO AN AXLE OF A VEHICLE

CROSS-REFERENCE TO RELATED APPLICATIONS

N/A

BACKGROUND

U.S. Pat. No. 11,453,444 describes various vehicle protection systems that can be secured to an axle of a vehicle to position a protective covering, such as a fender, around a wheel of the vehicle. Embodiments of the present invention are directed to a mechanism by which such vehicle protection systems and backing plates of brake assemblies can be secured to an axle.

FIG. 1A illustrates a common drum brake assembly 20 that is secured to an axle 10 of a vehicle, such as a trailer. Among other components, drum brake assembly 20 includes a backing plate 21 and a drum/wheel hub 22 through which wheel studs 23 extend to allow a wheel to be secured to a spindle 11 of axle 10. The vehicle may also include a leaf spring 30 that is secured to axle 10 and functions to provide suspension.

FIG. 1B illustrates another axle 10 to which a drum brake assembly could be secured. An axle flange 12 is typically welded to axle 10 and forms the connection point for drum break assembly 20. In particular, backing plate 21 is typically bolted to axle flange 12. In FIG. 1B, axle flange 12 includes four bolt holes.

FIG. 1C illustrates another common axle flange 12 which includes five bolt holes 13. FIG. 1D illustrates a backing plate 21 that includes five bolt holes 21a. To secure backing plate 21 to axle flange 12 and therefore to axle 10, bolts 13 can be inserted through bolts holes 13 and 21a and then secured via nuts (not shown).

BRIEF SUMMARY

The present invention extends to a mechanism for securing a vehicle protection system and a backing plate of a brake assembly to an axle of a vehicle. The mechanism may include a plurality of studs that are configured to secure the vehicle protection system and the backing plate of a brake assembly to an axle flange of a vehicle's axle. Each stud may include an outer end separated from an inner end by a spacer. The outer end may also include an expanded section adjacent the spacer that can be positioned within bolt holes of the axle flange. The expanded section may include knurls for forming a press fit within the bolt holes.

In some embodiments, the present invention may be implemented as a mechanism for securing a vehicle protection system and a backing plate of a brake assembly to an axle flange of a vehicle's axle. The mechanism can include a plurality of studs. Each stud may include an outer end configured to be secured to an axle flange of a vehicle's axle, an inner end configured to be secured to a vehicle protection system, and a spacer from which the outer end and the inner end extend in opposite directions.

In some embodiments, the outer end may be configured to insert through the axle flange and through a backing plate of a brake assembly.

In some embodiments, the inner end may be configured to insert through one or more back plates of the vehicle protection system.

In some embodiments, the inner end may be configured to insert through one or more brackets of the vehicle protection system.

In some embodiments, the outer end may include an expanded section that is configured to be positioned within the axle flange.

In some embodiments, the expanded section may form a press fit with the axle flange.

In some embodiments, the expanded section may include knurls.

In some embodiments, the spacer may include opposing flattened sections.

In some embodiments, a length of the inner end and a length of the outer end may be approximately 1¼".

In some embodiments, a length of the spacer may be approximately ½".

In some embodiments, the present invention may be implemented as a stud for securing a vehicle protection system and a backing plate of a brake assembly to an axle flange of a vehicle's axle. The stud may include an outer end configured to be secured to an axle flange of a vehicle's axle, an inner end configured to be secured to a vehicle protection system, and a spacer from which the outer end and the inner end extend in opposite directions.

In some embodiments, the outer end may be configured to insert through the axle flange and through a backing plate of a brake assembly.

In some embodiments, the inner end may be configured to insert through one or more back plates of the vehicle protection system.

In some embodiments, the inner end may be configured to insert through one or more brackets of the vehicle protection system.

In some embodiments, the outer end may include an expanded section that is configured to be positioned within the axle flange.

In some embodiments, the spacer may include opposing flattened sections.

In some embodiments, the present invention may be implemented as a vehicle protection system that includes one or more back plates, a fender supported by the one or more back plates, and a plurality of studs for securing the one or more back plates to an axle flange of a vehicle's axle to thereby position the fender around a tire of the vehicle. Each stud may include an outer end that extends through the axle flange, an inner end that secures the one or more back plates to the stud, and a spacer from which the outer end and the inner end extend in opposite directions.

In some embodiments, the outer end may be configured to secure a backing plate of a brake assembly to the axle flange.

In some embodiments, the outer end may include an expanded section.

In some embodiments, the spacer may include opposing flattened surfaces.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

In this specification and the claims, the term "approximately" should be construed as encompassing the stated dimension and other dimensions within 10% of the stated dimension.

Figure 2A:
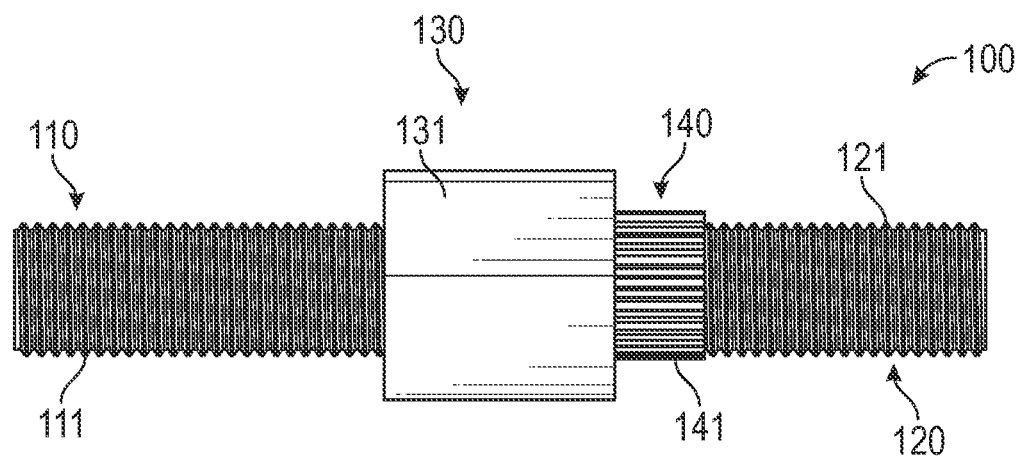
FIGS. 2A and 2B are perspective views of a stud that can function as a mechanism for securing a vehicle protection system to an axle of a vehicle in accordance with embodiments of the present invention.
Figure 2B:
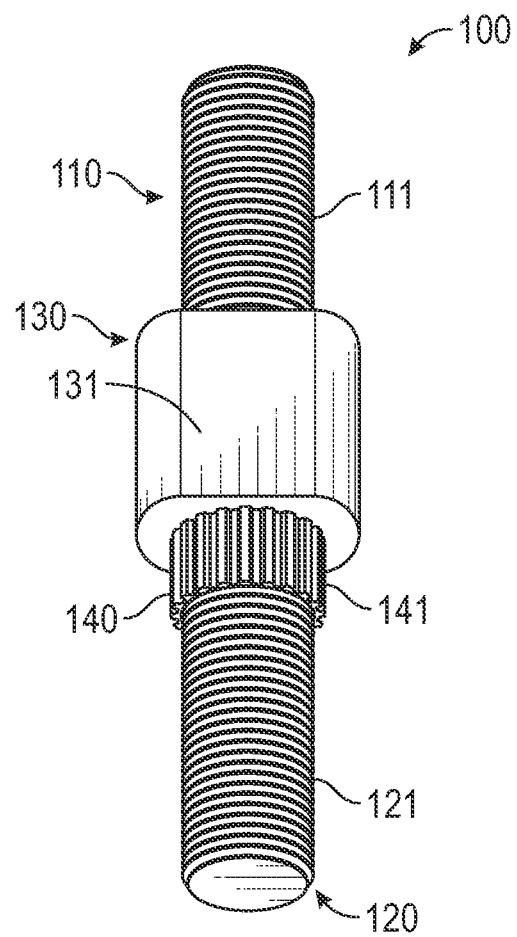

FIGS. 2A and 2B are perspective views of a stud 100 that can be used in a mechanism for securing a vehicle protection system and a backing plate of a brake assembly to an axle of a vehicle in accordance with one or more embodiments of the present invention. Stud 100 includes an inner end 110 having threads 111, an outer end 120 having threads 121 and a spacer 130 from which inner end 110 and outer end 120 extend in opposite directions. Outer end 120 may also include an expanded section 140 positioned adjacent to spacer 130. Knurls 141 may be formed on expanded section 140. Spacer 130 may have a generally cylindrical shape and may include opposing flattened surfaces 131 for receiving a wrench.

Figure 3A:
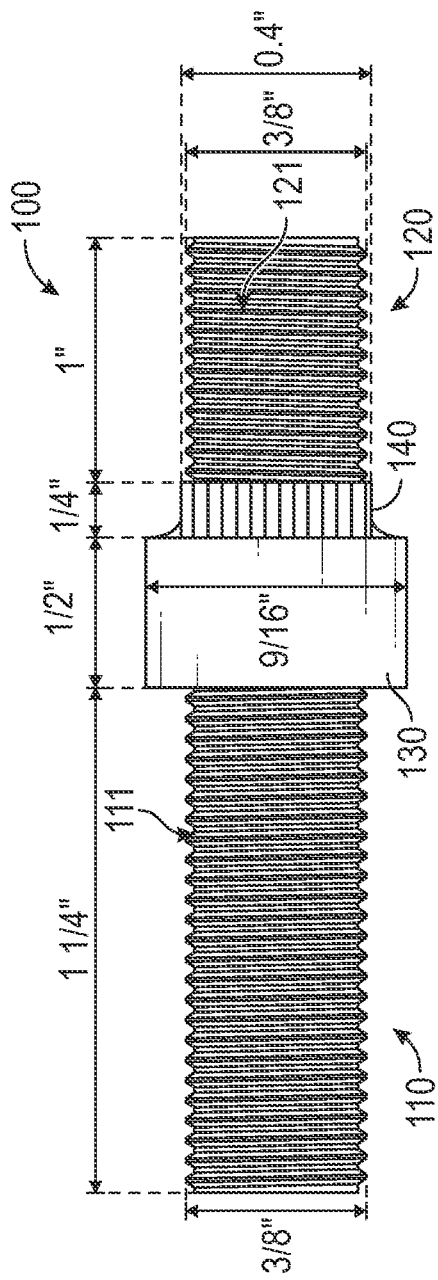
FIGS. 3A and 3B are top and end views of the stud.
Figure 3B:
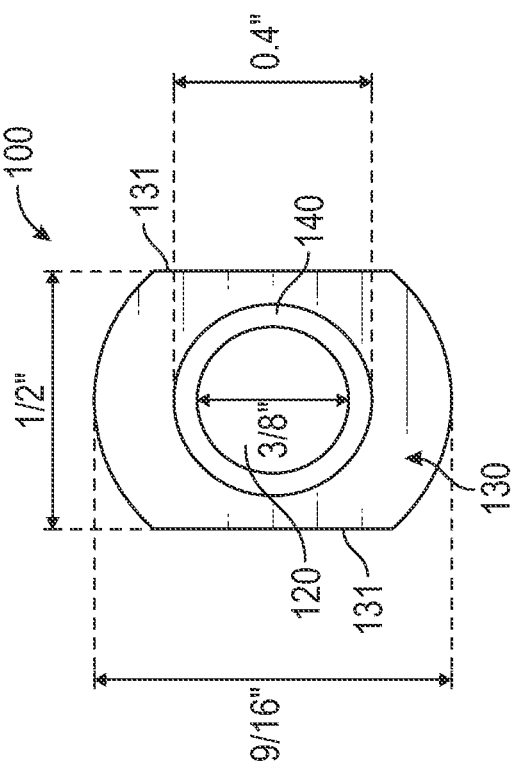

FIGS. 3A and 3B are top and end views respectively of stud 100 and provide example dimensions for its components. In some embodiments, inner end 110 and outer end 120 may each be approximately 1¼" long and spacer 130 may be approximately ½" long. The threaded portion of outer end 120 could be approximately 1" long and expanded section 140 could be approximately ¼" long. Both inner end 110 and outer end 120 may have ⅜" threads. Expanded section 140 could have a diameter of approximately 0.4". The diameter of spacer 130 could be approximately 9⁄16" and the width of spacer 130 at flattened surfaces 131 could be approximately ½".

Figure 1A:
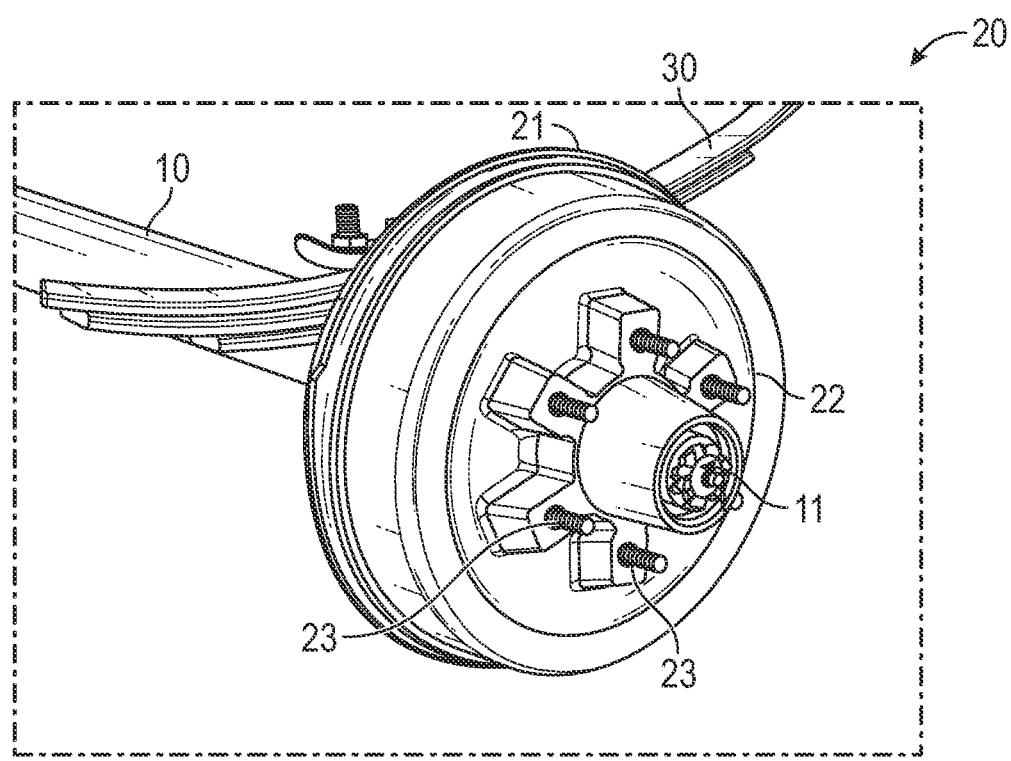
FIG. 1A is an outer view of a prior art drum brake assembly that is secured to an axle of a vehicle.
Figure 1B:
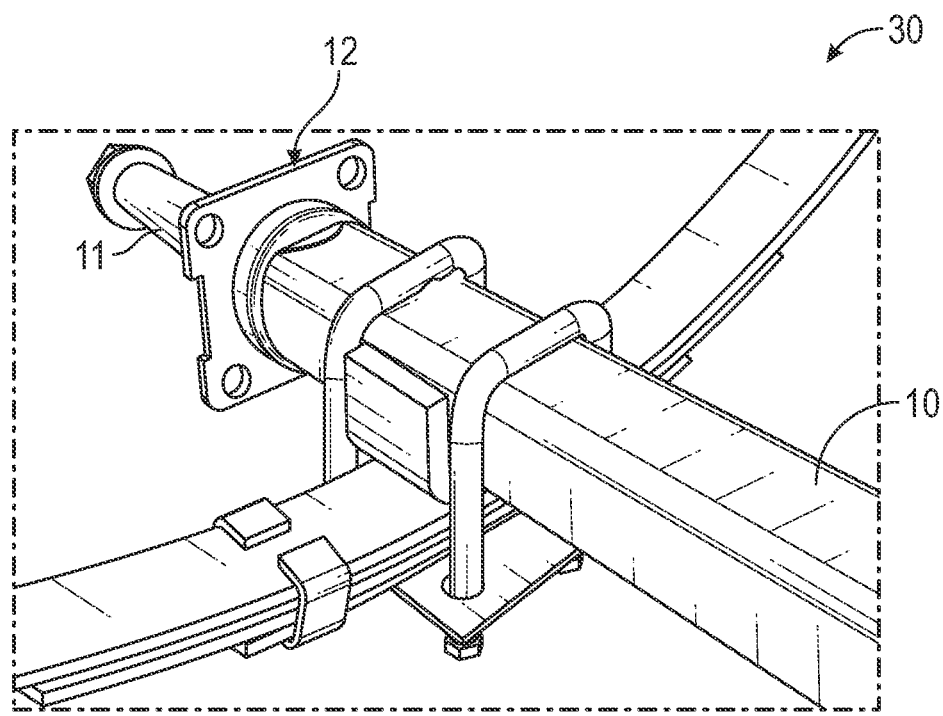
FIG. 1B is an inner view of a prior art axle having an axle flange by which a drum brake assembly can be secured to the axle.
Figure 1C:
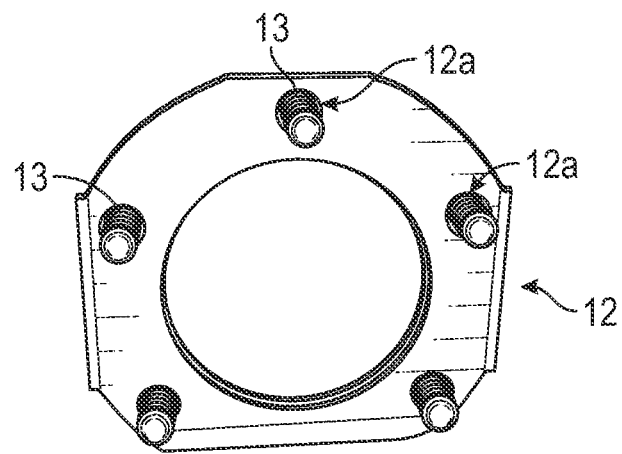
FIG. 1C illustrates a prior art axle flange in isolation.
Figure 1D:
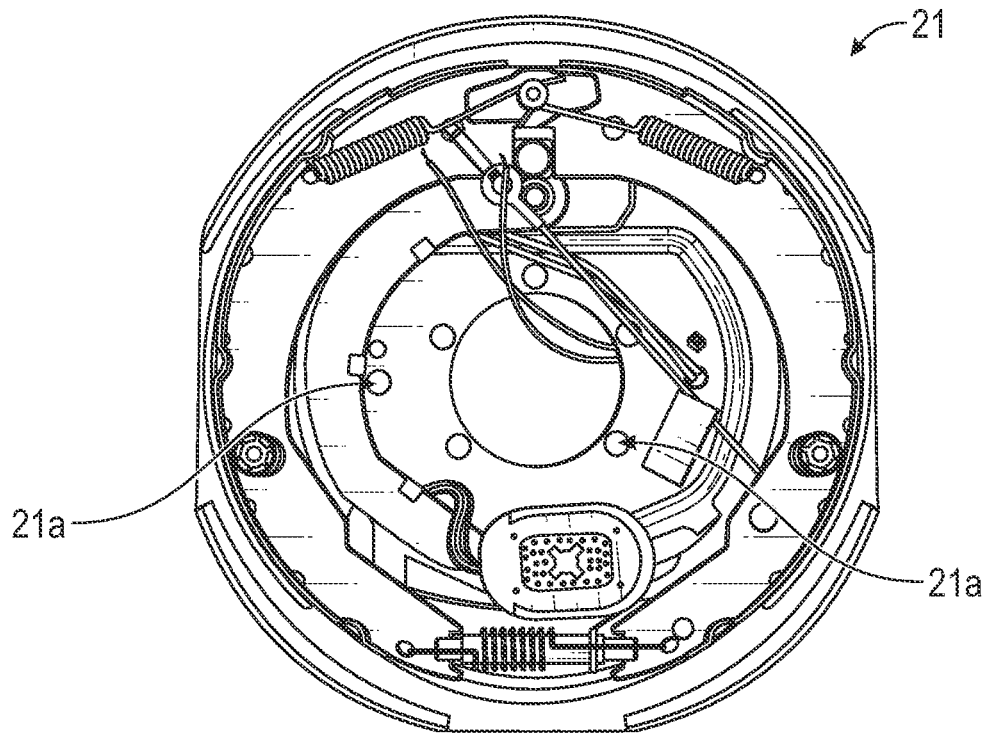
FIG. 1D illustrates a prior art backing plate of a drum brake assembly in isolation.
Figure 4:
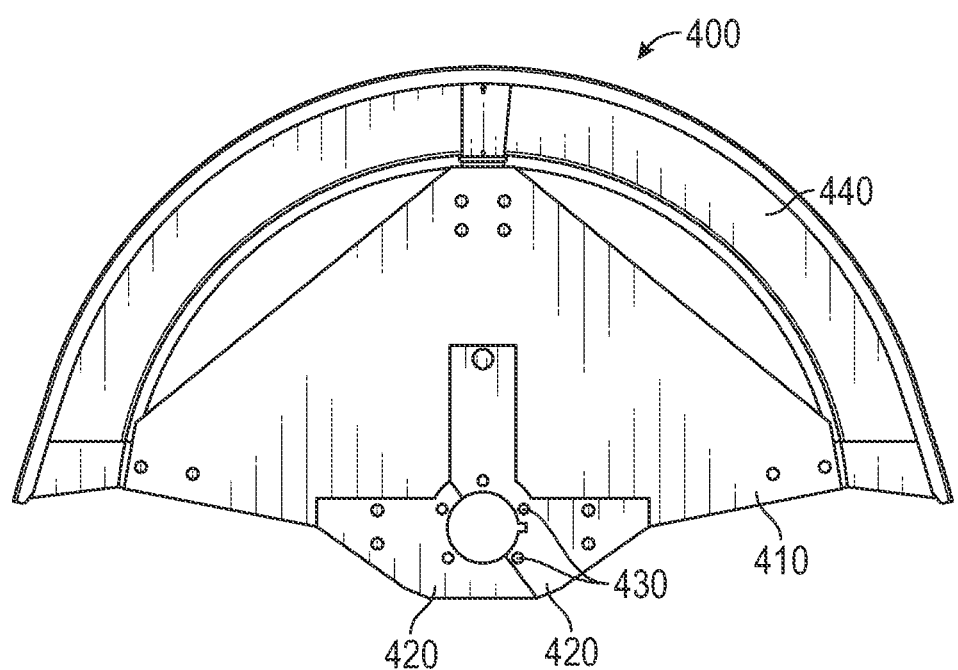
FIG. 4 is an outer view of a vehicle protection system that may be secured to an axle of a vehicle via a mechanism configured in accordance with embodiments of the present invention.

FIG. 4 provides an example of a vehicle protection system 400 that may be secured to an axle of a vehicle using a mechanism configured in accordance with embodiments of the present invention. Vehicle protection system 400 includes a back plate 410 (or one or more back plates) that may include an opening for the axle and may include holes 430 matching the hole pattern of an axle flange of the axle to which vehicle protection system 400 is to be secured. In the depicted embodiment, holes 430 are arranged in a five-hole pattern, but other hole patterns could be used such as the four-hole pattern shown in FIG. 1B. Vehicle protection system 400 also includes one or more brackets 420 which may be used to reinforce back plate(s) 410. Vehicle protection system 400 further includes a fender 440 that is secured to back plate(s) 410. U.S. Pat. No. 11,453,444, which is incorporated by reference, discloses various other configurations of a vehicle protection system that could be secured to an axle via a mechanism configured in accordance with embodiments of the present invention.

Figure 5A:
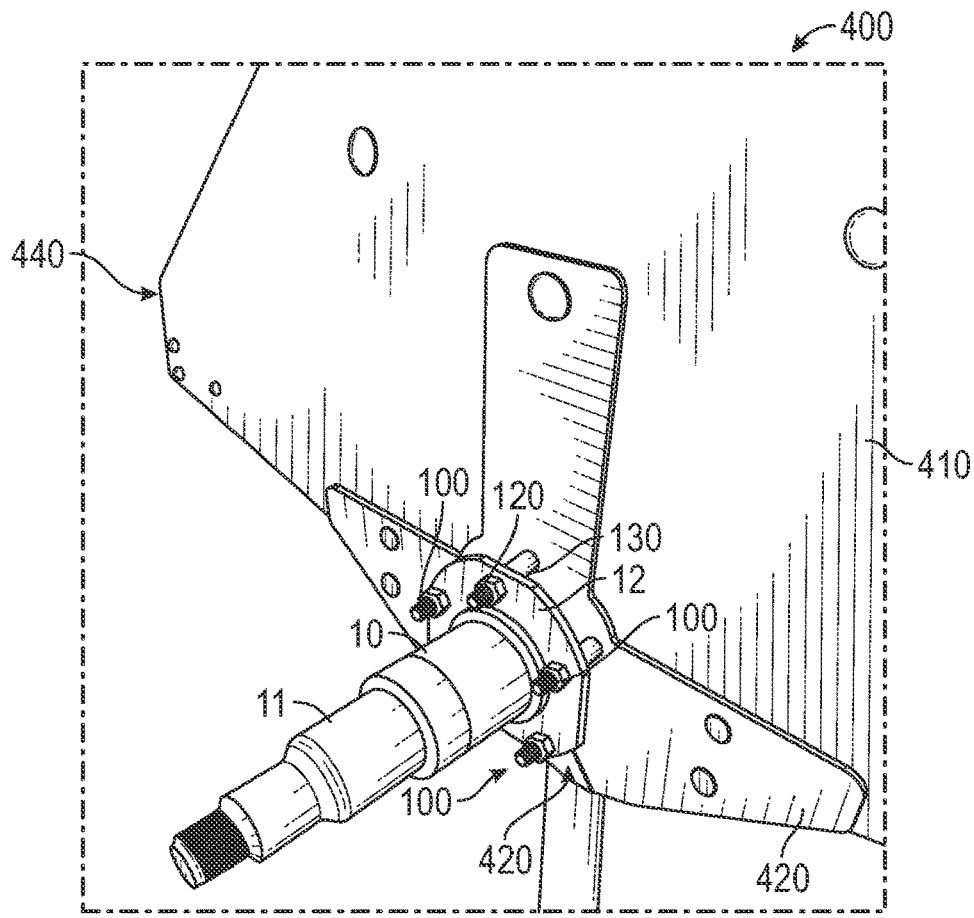
FIGS. 5A-5C are perspective outer, top outer, and perspective inner views respectively of the vehicle protection system of FIG. 4 when secured to an axle of a vehicle using a mechanism configured in accordance with embodiments of the present invention.
Figure 5B:
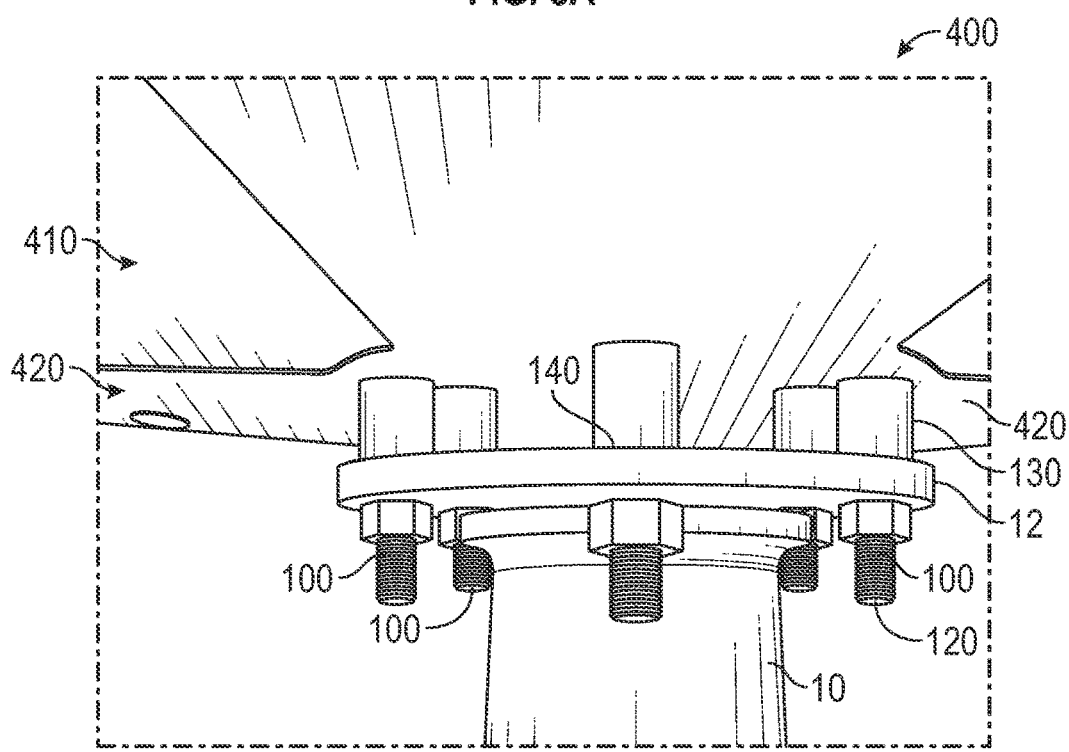
Figure 5C:
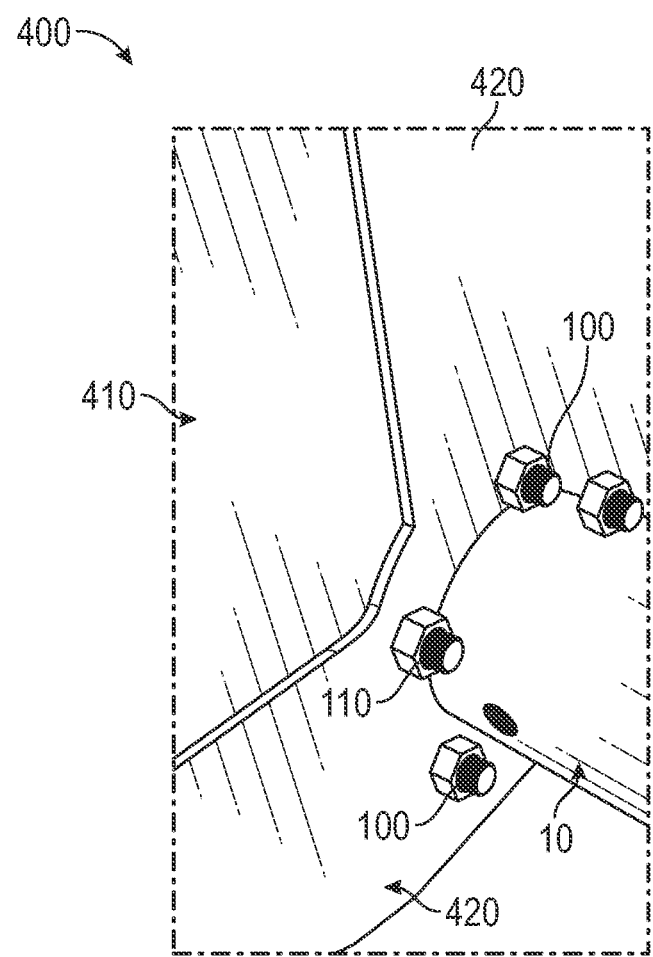

FIGS. 5A-5C show how studs 100 can form a mechanism for securing vehicle protection system 400 to axle flange 12. In FIGS. 5A and 5B, backing plate 21 is removed to show how studs 100 connect to axle flange 12. As shown, outer ends 120 are inserted through bolt holes 12a of axle flange 12 to position expanded sections 140 within bolt holes 12a and to cause the thread portion of outer ends 120 to extend outwardly and through backing plate 21. In the illustration, nuts are secured around outer ends 120 and against axle flange 12. In use, however, these nuts would be secured around outer ends 120 after positioning backing plate 21 against axle flange 12 to cause outer ends 120 to insert through bolt holes 21a.

As best seen in FIG. 5B, spacers 130 are positioned against the inside of axle flange 12 and can function to space back plate(s) 410 and possibly bracket(s) 420 away from axle flange 12 while allowing these component(s) to be tightened securely to axle flange 12. FIG. 5C illustrates the inside of back plate(s) 410 and shows that inner ends 110 of studs 100 extend through holes 430. Nuts can be secured around inner ends 110 to hold back plate(s) 410 tightly against spacers 130. To facilitate the tightening of nuts around inner ends 110 and/or outer ends 120, a wrench can be placed over flattened surfaces 131 of spacer 130.

In this way, studs 100 form a mechanism for securing a vehicle protection system and a backing plate of a brake assembly to an axle flange. Although the depicted embodiments represent use cases involving a drum brake assembly, a mechanism configured in accordance with embodiments of the present invention could be used to secure a vehicle protection system and the backing plate of a disk brake assembly or other type of brake assembly to an axle flange.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A mechanism for securing a vehicle protection system and a backing plate of a brake assembly to an axle flange of a vehicle's axle, the mechanism comprising:
   a plurality of studs, each stud comprising:
      an outer end configured to be secured to an axle flange of a vehicle's axle, the outer end comprising an expanded section that is configured to be positioned within the axle flange;
      an inner end configured to be secured to a vehicle protection system; and a spacer from which the outer end and the inner end extend in opposite directions.

2. The mechanism of claim 1, wherein the outer end is configured to insert through the axle flange and through a backing plate of a brake assembly.

3. The mechanism of claim 1, wherein the inner end is configured to insert through one or more back plates of the vehicle protection system.

4. The mechanism of claim 3, wherein the inner end is configured to insert through one or more brackets of the vehicle protection system.

5. The mechanism of claim 1, wherein the expanded section forms a press fit with the axle flange.

6. The mechanism of claim 1, wherein the expanded section includes knurls.

7. The mechanism of claim 1, wherein the spacer includes opposing flattened sections.

8. The mechanism of claim 1, wherein a length of the inner end and a length of the outer end is approximately 1¼".

9. The mechanism of claim 8, wherein a length of the spacer is approximately ½".

10. A stud for securing a vehicle protection system and a backing plate of a brake assembly to an axle flange of a vehicle's axle, the stud comprising:
    an outer end configured to be secured to an axle flange of a vehicle's axle, the outer end comprising an expanded section that is configured to be positioned within the axle flange;
    an inner end configured to be secured to a vehicle protection system; and
    a spacer from which the outer end and the inner end extend in opposite directions.

11. The stud of claim 10, wherein the outer end is configured to insert through the axle flange and through a backing plate of a brake assembly.

12. The stud of claim 10, wherein the inner end is configured to insert through one or more back plates of the vehicle protection system.

13. The stud of claim 12, wherein the inner end is configured to insert through one or more brackets of the vehicle protection system.

14. The stud of claim 10, wherein the spacer includes opposing flattened sections.

15. A vehicle protection system comprising:
    one or more back plates;
    a fender supported by the one or more back plates;
    a plurality of studs for securing the one or more back plates to an axle flange of a vehicle's axle to thereby position the fender around a tire of the vehicle, each stud comprising:
        an outer end that extends through the axle flange, the outer end comprising an expanded section;
        an inner end that secures the one or more back plates to the stud; and
        a spacer from which the outer end and the inner end extend in opposite directions.

16. The vehicle protection system of claim 15, wherein the outer end is configured to secure a backing plate of a brake assembly to the axle flange.

17. The vehicle protection system of claim 15, wherein the spacer includes opposing flattened surfaces.

* * * * *